United States Patent
Hsu et al.

(10) Patent No.: US 8,237,656 B2
(45) Date of Patent: Aug. 7, 2012

(54) MULTI-AXIS MOTION-BASED REMOTE CONTROL

(75) Inventors: Feng-Hsiung Hsu, Cupertino, CA (US); Rui Gao, Beijing (CN)

(73) Assignee: Microsoft Corporation, Redmond, WA (US)

(*) Notice: Subject to any disclaimer, the term of this patent is extended or adjusted under 35 U.S.C. 154(b) by 805 days.

(21) Appl. No.: 11/774,515

(22) Filed: Jul. 6, 2007

(65) Prior Publication Data
US 2009/0009469 A1    Jan. 8, 2009

(51) Int. Cl.
G06F 3/033 (2006.01)
(52) U.S. Cl. ........................ 345/158
(58) Field of Classification Search ............ 345/163, 345/161, 158, 157, 156
See application file for complete search history.

(56) References Cited

U.S. PATENT DOCUMENTS

| | | |
|---|---|---|
| 5,181,181 A | 1/1993 | Glynn |
| 5,227,985 A | 7/1993 | DeMenthon |
| 5,461,478 A | 10/1995 | Sakakibara et al. |
| 5,617,312 A | 4/1997 | Iura et al. |
| 5,686,942 A | 11/1997 | Ball |
| 5,784,282 A | 7/1998 | Abitbol et al. |
| 5,795,306 A | 8/1998 | Shimotani et al. |
| 5,818,424 A | 10/1998 | Korth |
| 5,856,844 A | 1/1999 | Batterman et al. |
| 5,926,168 A * | 7/1999 | Fan ............................. 345/158 |
| 6,417,836 B1 | 7/2002 | Kumar et al. |
| 6,456,728 B1 | 9/2002 | Doi et al. |
| 6,522,312 B2 | 2/2003 | Ohshima et al. |
| 6,538,645 B1 | 3/2003 | Juang et al. |
| 6,720,949 B1 | 4/2004 | Pryor et al. |
| 6,795,068 B1 | 9/2004 | Marks |
| 6,863,609 B2 | 3/2005 | Okuda et al. |
| 6,921,332 B2 | 7/2005 | Fukunaga et al. |
| 6,987,504 B2 | 1/2006 | Rosenberg et al. |
| 7,489,299 B2 * | 2/2009 | Liberty et al. ............. 345/163 |
| 7,711,146 B2 * | 5/2010 | Tu et al. ................... 382/103 |
| 7,920,718 B2 * | 4/2011 | Marrion et al. ........... 382/103 |

(Continued)

FOREIGN PATENT DOCUMENTS

JP    07005983    1/1995

(Continued)

OTHER PUBLICATIONS

PCT Search Report and Written Opinion for PCT Application No. PCT/US2007/015216 mailed on Feb. 11, 2008.
Cutler, et al., "View-based Interpretation of Real-time Optical Flow for Gesture Recognition", Proc. Third IEEE Conference on Face Gesture Recognition, Nara, Japan, Apr. 1998, 6 pages.

(Continued)

*Primary Examiner* — Nitin Patel
*Assistant Examiner* — Jeffrey A Parker
(74) *Attorney, Agent, or Firm* — Lee & Hayes, PLLC

(57) ABSTRACT

Motion-based control of an electronic device uses an array of at least three reference elements forming a triangle. An image sensor (e.g., a video camera), which may be located on a user-manipulated device, captures an image of the array. The array image has a pattern formed by a nonparallel projection of the reference triangle onto the image sensor. The pattern carries information of the relative position between the image sensor and the reference element array, and changes as the relative position changes. The pattern is identified and used for generating position information, which may express a multidimensional position of the user-manipulated device with respect to three axes describing a translational position, and three rotational axes describing pitch, roll and yaw motions. The control system and method are particularly suitable for videogames.

19 Claims, 10 Drawing Sheets

U.S. PATENT DOCUMENTS

| | | | |
|---|---|---|---|
| 2002/0039111 A1 | 4/2002 | Gips et al. | |
| 2002/0126090 A1 | 9/2002 | Kirkpatrick et al. | |
| 2003/0052859 A1 | 3/2003 | Finley | |
| 2005/0062719 A1* | 3/2005 | Hinckley et al. | 345/163 |
| 2005/0068198 A1* | 3/2005 | Brega et al. | 340/933 |
| 2006/0050052 A1 | 3/2006 | Mekenkamp et al. | |
| 2006/0264259 A1 | 11/2006 | Zalewski et al. | |
| 2006/0287083 A1 | 12/2006 | Ofek et al. | |
| 2007/0257884 A1* | 11/2007 | Taira et al. | 345/158 |
| 2007/0273464 A1* | 11/2007 | Kitahara et al. | 335/212 |
| 2008/0024435 A1* | 1/2008 | Dohta | 345/156 |
| 2008/0100825 A1* | 5/2008 | Zalewski | 356/29 |
| 2008/0117167 A1* | 5/2008 | Aonuma et al. | 345/157 |
| 2009/0009596 A1* | 1/2009 | Kerr et al. | 348/117 |

FOREIGN PATENT DOCUMENTS

| | | |
|---|---|---|
| JP | 09034633 A | 2/1997 |
| JP | 12181601 A | 6/2000 |
| JP | 13236181 A | 8/2001 |
| JP | 18079249 A | 3/2006 |
| KR | 20040027561 A | 4/2004 |

OTHER PUBLICATIONS

Hinckley, et al., "The VideoMouse: A Camera-Based Multi-Degree-of-Freedom Input Device," UIST'99, ACM 1999, CHI Letters, vol. 1, pp. 103-112.

Jeon, et al., "Interaction Techniques in Large Display Environments using Hand-held Devices", VRST'06, ACM, 2006, 4 pgs.

Murph, "Sony patents LED-infused, motion-tracking controller", retrieved on May 3, 2007, at <<http://www.engadget.com/2006/12/14/sony-patents-led-infused-motion-tracking-controller/>>, engadget, Weblogs, Inc., Dec. 14, 2006, pp. 1-6.

"SmartNAV3 AT: How It Works," available at <<http://www.naturalpoint.com/smartnav/products/at/at_howitworks.html>>, accessed on Apr. 19, 2006, 2 pages.

TrackIR product Description, available at <<http://www.naturalpoint.com/trackir/02-products/product-how-TrackIR-works.html>>, accessed on Apr. 19, 2006, 2 pages.

Office Action for U.S. Appl. No. 13/208,003, mailed on Dec. 22, 2011, Feng-Hsiung Hsu, "Generating Position Information Using a Video Camera", 9 pgs.

* cited by examiner

MULTI-AXIS MOTION-BASED REMOTE CONTROL

BACKGROUND

There exist a variety of devices which allow a user to control a software application run on an electronic device such as a game console or personal computer. The user may manipulate these controller devices to control an on-screen pointer, to control the behavior of a game figure, and so on. In addition, the software application may use the input through the controller device without any onscreen pointer. For example, a motion of a remote control may be detected or otherwise determined for simulation of an on-screen activity such as a sports activity. The most prevalent of such devices include keyboards, mouse devices, joy sticks, trackballs, voice recognition tools, hand-held remote controls and so on. Less common types of control devices include data gloves, inertial sensors, radio positioning mechanisms, and so on.

Known control devices may have various shortcomings. For instance, some control devices may not capture user input with sufficient degrees of freedom (DOF) to control certain applications. Other control devices may provide position information that is not sufficiently precise or reliable. Other control devices may be cumbersome to use. Other control devices may be prohibitively expensive. Known control devices may suffer from yet other shortcomings.

Among the variety of controller devices, motion-based (or motion-sensitive) remote controllers have gained significant commercial interests recently, especially in the gaming industry. There are two types of motion-based control techniques. The first type uses a motion detection device such as an accelerometer or gyroscopes which can inherently measure its own motion. The second type uses remote sensing techniques to determine the positions of a moving object (such as a hand-held controller used by a user) and then translate the change of the positions to knowledge of the motion of the moving object. The two types of motion-based control techniques may be combined. The present motion-based controllers using remote sensing techniques tend to have one or more shortcomings including complicated design, high cost for fabrication, lack of flexibility, bulky size, lack of accuracy, and too few degrees (dimensions) of position/orientation determination.

For at least one or more of the above-identified exemplary and non-limiting reasons, there is a need in the art for more satisfactory strategies for controlling an application.

SUMMARY

Motion-based control of an electronic device uses an array of at least three reference elements forming a triangle. An image sensor (e.g., a video camera) captures an image of the reference element array. The captured array image has a pattern that carries information of the relative position between the image sensor and the reference element array, and changes as the relative position changes. The pattern is identified and used for generating position information, which may express a multidimensional position of the image sensor with respect to multiple axes. The control system and method are particularly suitable for controlling a game console using a hand-held remote control via a game player.

The reference elements may be active lighting device such as infrared LEDs. In one embodiment, the image sensor is associated with the user-manipulated device, and may preferably be an integral part of thereof. The reference element array may be placed either on top, or near a bottom portion of a display unit (e.g., a TV) connected to the electronic device (e.g., a game console). The position information expresses a multidimensional position of the user-manipulated device relative to the reference element array. The multidimensional position may be described with respect to multiple axes including three axes describing a translational position, and three rotational axes describing pitch, roll and yaw motions. In some embodiments, the user-manipulated device is a hand-held remote control, and may communicate information wirelessly. A supplemental motion detection sensor such as an inertia sensor may also be used to acquire additional position information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
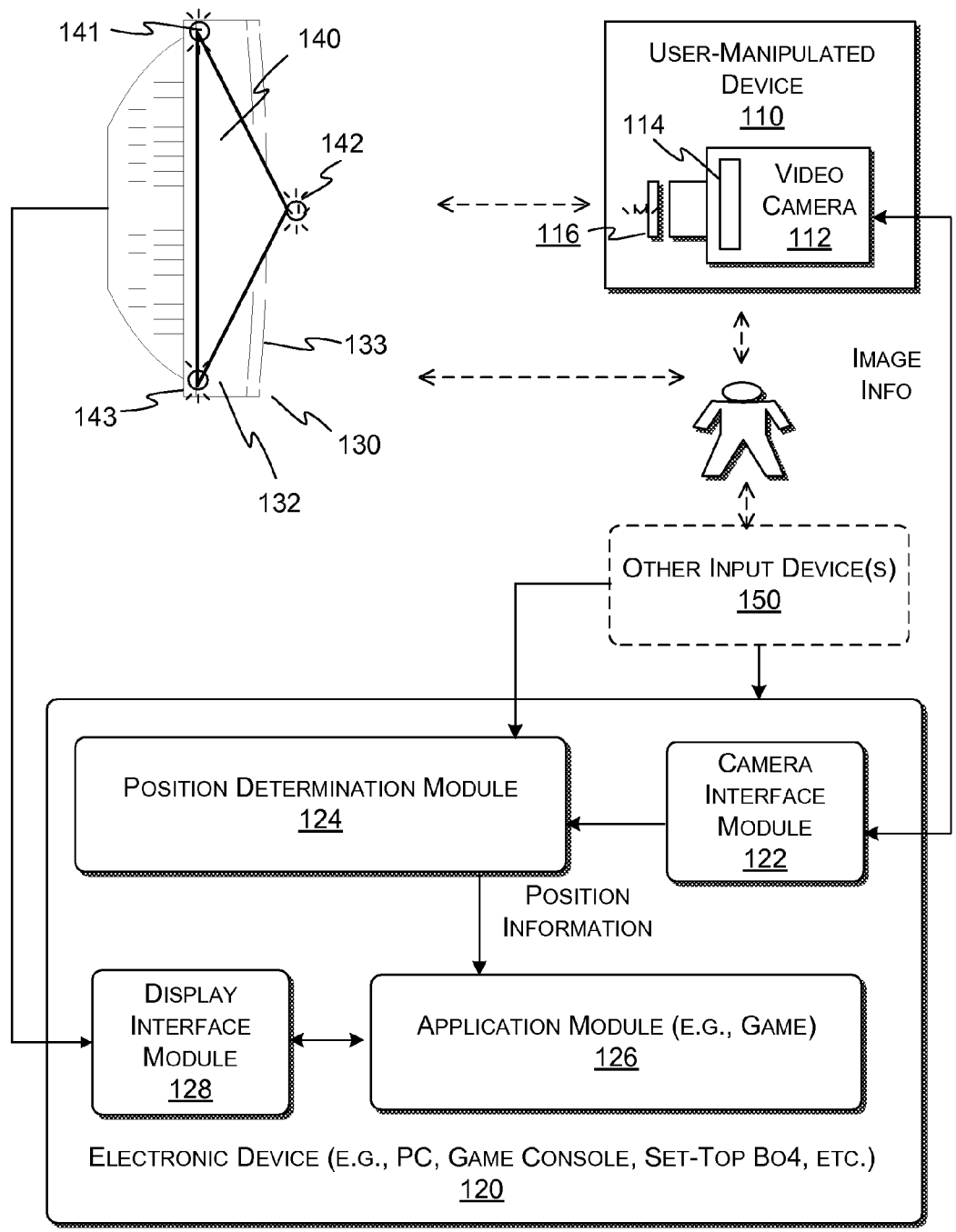
FIG. 1 is a block diagram showing a system which provides a first implementation of the strategy for controlling an electronic device based on image information obtained from a video camera.

This disclosure sets forth a strategy for controlling an electronic device or a software application run by an electronic device based on image information obtained from an image sensor such as that of a video camera. The disclosure includes the following sections: Section A describes exemplary systems for implementing the strategy, while Section B describes an exemplary procedure for implementing the strategy.

The disclosed strategy relates to motion-based control of an electronic device, such as a game console. The strategy uses an array of at least three reference elements forming a triangle. An image sensor (e.g., a video camera) captures an image of the reference element array. The array image has a pattern formed by a nonparallel projection of the reference triangle onto the image sensor. The pattern carries information of the relative position between the image sensor and the reference element array, and changes as the relative position changes. The position information extracted from the pattern may express a multidimensional position of the image sensor with respect to multiple axes.

In general, there are at least two techniques for implementing the strategy. A first technique places the reference element array near or on a display device connected to the electronic device and couples the video camera including its image sensor to the user-manipulated device itself (e.g., a remote control device), such that the video camera moves with the user-manipulated device. The movable video camera captures image information of the reference element array. A position determination module identifies a pattern of the image of the reference element array in the image information and then computes position information based on the identified pattern. The position information, in turn, can be used to control the electronic device or an application run on the electronic device.

A second technique couples the reference element array to the user-manipulated device. A stationary video camera captures image information of the mobile reference element array. The position determination module processes the image information in the manner specified above.

In applications which prefer or require a compact user-manipulated device, the first technique may be preferable to avoid the reference element array being too limited in size. However, in principle, both techniques are usable, especially when the resolution of the video camera is sufficiently high to detect relatively small geometrical changes of the captured pattern.

A. Exemplary System (FIGS. 1-8)

Generally, any of the functions described with reference to the figures can be implemented using software, hardware (e.g., fixed logic circuitry), manual processing, or a combination of these implementations. The term "logic, "module" or "functionality" as used herein generally represents software, hardware, or a combination of software and hardware. For instance, in the case of a software implementation, the term "logic," "module," or "functionality" represents program code (or declarative content) that is configured to perform specified tasks when executed on a processing device or devices (e.g., CPU or CPUs). The program code can be stored in one or more computer readable media.

More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, solid state, etc.). The term machine-readable media also encompasses transitory forms of representing information, including various hardwired and/or wireless links for transmitting the information from one point to another.

A.1. First Type Implementation A: Mobile Image Sensor (FIGS. 1-7)

FIG. 1 is a block diagram showing a system 100 which provides a first implementation of the strategy. In this system 100, a user manipulates a user-manipulated device 110 to interact with electronic device 120 (or an application run on electronic device 120) through a display device 130. Video camera 112 is attached to user-manipulated device 110 so that the video camera 112 and the user-manipulated device 110 are movable together as one piece. In one embodiment, video camera 112 may be an integral part of user-manipulated device 110. The video camera 112 has an image sensor 114 and a lens and filter assembly 116 generally facing display device 130 during operation.

Reference element array 140 is placed on top 132 of the display device 130 in the exemplary configuration shown, but may also be placed at another location nearby the display device 130, for instance near the bottom of the display device 130. Reference element array 140 has three reference elements 141, 142 and 143 which define vertices of a reference triangle and are generally visible by video camera 112 when the video camera 112 is facing the display device 130 within an operational range of angles. As will be shown herein, the reference element array 140 is configured to forms an array image on the image sensor 114 through a three-dimensional projection of the reference triangle onto the image sensor 114. The array image has a pattern changing shape as the relative position between the image sensor 114 and reference element array 140 changes.

In some embodiments, as is the featured embodiment of FIG. 1, the three-dimensional projection of the reference element array 140 onto the image sensor 114 is a nonparallel projection, meaning that the object plane defined by the triangle formed by reference elements 141, 142 and 143 is not parallel to the image plane defined by the image sensor 114 when the user-manipulated device 110 is at a normal position and pointing normally to the display device 130. To accomplish this, the reference element array 140 may be placed relative to display device 130 such that the reference triangle defines a plane substantially nonparallel to the front surface 133 of the display device 130. In the exemplary shown in FIG. 1, the plane defined by the reference triangle (140) is substantially perpendicular to the front surface 133 of the display device 130. As will be shown herein, as the image of the reference element array 140 is formed by projecting the reference element array 140 in a three-dimensional space onto image sensor 114, this configuration enhances the multidimensional information (stereo information) carried by the image of the reference element array 140 captured by video camera 112. In comparison, if the triangle of the reference element array 140 is parallel to, or close to be parallel to, the surface of image sensor 114, the projection is reduced to a simple parallel projection which carries less stereo information.

The user-manipulated device 110 can include any kind of control mechanism, including a remote control device, any kind of game control device, and so forth. The user-manipulated device 110 may represent a handheld device that the user can move about (with the user's hands) to achieve a desired control operation. Or the user-manipulated device 110 may represent a device with one or more members that the user can separately move about to achieve a desired control operation. Or the user-manipulated device 110 can comprise a device that is worn by the user, such as a data glove-type device, a wristband-type device, a headband-type or hat-type device, a shoe-borne device, and so forth (or any combination thereof). Although not shown, the user-manipulated device 110 can also include any variety of control actuators (buttons, joysticks, knobs, steering mechanisms, etc.) to provide input commands and other selections.

The reference element array 140 may be affixed to the display device 130 (or otherwise placed in a defined positional relationship with the user-manipulated device 110). To facilitate discussion, this subsection will assume that the user-manipulated device 110 includes three reference elements 141, 142 and 143. However, in other embodiments reference element array may include more than three reference elements forming either a polygon, or multiple triangles. In one exemplary case, a reference element can comprise a light emitting element, such as a light emitting diode (LED). For instance, the reference elements 141, 142 and 143 can be each composed of one or more infrared LEDs, one or more visible-spectrum LEDs, and so forth. In the case of visible spectrum LEDs, one or more primary color LEDs can be used to help distinguish the LEDs from other objects in a scene. These LEDs can also be placed on a darkened background to better distinguish the LEDs from other objects in a scene. In yet another implementation, one or more passive reference elements can be used that do not independently generate electromagnetic energy. For instance, the reference elements 141, 142 and 143 can each be composed of one or more reflective dots that can be distinguished by virtue of their telltale reflectance of infrared radiation or visible-spectrum light.

In addition, to help acquire position information and to also help discriminate the reference elements 141, 142 and 143 from other objects, the reference element array 140 can arrange its reference elements in a predetermined pattern. In the exemplary embodiment shown in FIG. 1, the reference elements 141, 142 and 143 are arranged as a triangle with reference element 142 pointing forward to video camera 112. Other arrangements may be used. With a triangle arrangement, one of the reference elements (e.g., reference element 142) may also be pointing backward away from video camera 112.

The video camera 112 captures image information of the reference element array 140. The image information provides a depiction of the reference elements 141, 142 and 143 (or at least part thereof). To function in this manner, the video camera 112 can be positioned so that its field of view encompasses at least part of, and preferably all of, the reference element array 140 when the user is expected to be operating the user-manipulated device 110 to interact with electronic device 120 (or an application run by the electronic device 120).

The image sensor 114 may be any suitable imaging device that converts a visual image to an electric signal. It may be an array of charge-coupled devices (CCD) or CMOS sensors such as active pixel sensors. The image sensor 114 may be a color image sensor or black and white image sensor, or may be adapted for infrared light. Various color separation mechanism, including Bayer algorithm may be used if a color sensor is used.

The video camera 112 may be replaced by a still image camera. However, in order to be used in action, the camera is preferably capable of capturing multiple images in a series, and more preferably a video camera capable of capturing at least 20 frames per second each depicting a different successive temporal state. The video camera 112 can comprise any kind of commercial or application-specific camera for capturing image information. The video camera 112 may optionally include one or more filters 116 configured to selectively pass electromagnetic radiation having a prescribed frequency. For instance, in the case that the reference elements 141, 142 and 143 is composed of one or more infrared LEDs, the video camera 112 can include an infrared filter to help selectively detect the infrared radiation generated by the infrared LEDs.

Alternatively, in the case that the reference elements 141, 142 and 143 includes passive reference elements, the system 100 can include one or more radiation emitting sources (not shown), such as infrared sources. These sources can generate light or infrared radiation which is reflected from the passive reference elements. The video camera 112 receives the reflected light or infrared radiation.

Electronic device 120 can utilize the position information to affect its operation or the operation of software application run by the electronic device 120. For example, the electronic device 120 can include a personal computer, a game console, a set-top box, and so on. FIG. 1 generically represents features of the electronic device 120 which are relevant to the processing of the image information. To facilitate explanation, FIG. 1 shows the electronic device 120 as being implemented by a single integral unit. However, the electronic device 120 can also represent plural units that are communicatively coupled together.

To begin with, the electronic device 120 can include a camera interface module 122. The camera interface module 122 receives image information from the video camera 112 and optionally converts this information into a form that allows it to be further processed by the electronic device 120. For instance, the camera interface module 122 can optionally convert any aspect of the format of the received image information to any other format. The electronic device 120 can implement the camera interface module 122 as a video card or like device which couples to a motherboard (not shown) of the electronic device 120.

The electronic device 120 also includes a position determination module 124. The purpose of the position determination module 124 is to detect and analyze the image information and generate position information therefrom. The position information reflects the position of the user-manipulated device 110 (and associated the video camera 112) in relation to reference elements 141, 142 and 143. The term "position information" in the implementation of FIG. 1 refers to the position of the video camera 112 with the image sensor 114 relative to a point of origin, such as the reference elements 141, 142 and 143, the display device 130, an object being presented on the display device, etc. The term "position information" can also describe the orientation of the video camera 114 relative to the point of origin.

To this function, the position determination module 124 can first receive information of an image of the reference element array from the image sensor 114, identify the pattern of the array image, and then generate position information based on the identified pattern of the array image. The position information expresses the relative position between the image sensor 114 and the reference element array 140. In the featured embodiment, because the video camera 112 with its image sensor 114 is attached to the user-manipulated device 110, the position information also expresses the relative position between the user-manipulated device 110 and the reference element array 140.

The position determination module 124 can detect the reference elements 141, 142 and 143 in various ways. For example, this can be accomplished by analyzing the pixel content of the image information received. In one technique, the reference elements 141, 142 and 143 may have visual characteristics which are distinguishable from other objects in the image information. For instance, suppose that the reference elements emit infrared radiation. In this implementation, the video camera 112 (equipped with an infrared filter)

can produce image information having bright spots against a darkened background, where the bright spots represent the reference elements. In another case, suppose that the reference elements emit primary color light. In this implementation, the video camera 112 can produce image information having bright primary-colored spots which can be distinguished from other objects in the scene (which typically do not have the same kind of monotonic primary color characteristics). These reference elements can even more readily be detected by placing them against a darkened background (such as by placing the reference elements on a black plate which can be a part of the reference element array 140).

The image information may be communicated from video camera 112 to camera interface module 122 either using a wire or wirelessly. Alternatively, the position determination module 124 may be implemented in user-manipulated device 110 to obtain position information and subsequently deliver or transmit the position transmission to electronic device 120.

The image of the reference element array 140 captured by video camera 112 generally has an image of each reference element 141, 142 and 143, as will be discussed in further detail herein with reference to FIGS. 3-7. If the video camera 112 is a digital camera, each reference element image may be a bright spot made of multiple pixels. In this case, the position determination module 124 may be configured to identify the pattern of the array image by clustering the multiple pixels of each reference element image to a separate group. For example, minimal spanning tree algorithm may be used to cluster the infrared points captured by the camera into three groups, where each group has multiple infrared points together forming a collective bright spot representing an image of one of the reference elements 141, 142 and 143. The algorithm may further take the brightness as weight, calculating the weighted barycenter of these groups of points. With image sensor of 640×480 pixels, for example, approximately two thousands points per frame may be allocated for the three brought spots representing images of reference elements 141, 142 and 143. This ensures that pattern recognition mechanism using minimal spanning tree algorithm is efficient and accurate.

In one embodiment, the video camera 112 takes 20 or more shots per second. This rate is generally sufficient to capture position information with ordinary speed of user movement. In this scenario, the position of the each light spot (bright spot corresponding to reference element 141, 142 or 143) will not change significantly within the two consecutive frames. Given the pre-knowledge of the shape and position of the reference element array 140, the position determination module 124 may be able to identify which light spot correspond to which of the reference elements 141, 142 and 143, although absolute identity may not be necessary to track changes. The position determination module 124 may label the light spots at the initial frame and the track them in the following frames in real time. The position determination module 124 can also distinguish the reference elements 141, 142 and 143 from each other based on a telltale prearrangement of between the reference elements 141, 142 and 143. For example, this function can be performed by comparing a pattern of candidate reference elements with predetermined and pre-stored patterns. If the pattern of elements in the image information matches one of the predetermined patterns, then the position determination module 124 can conclude that a bona fide reference array has been detected in the image information. Alternatively, each reference element 141, 142 and 143 may be differentiated by their distinctive colors, sizes or brightness.

Potentially more reliable positioning information can be extracted by using more unique reference elements. For example, one or more reference elements (e.g., 142) can also be lifted off a plane with respect to the other reference elements to facilitate discrimination of these elevated reference elements from other (non-elevated) reference elements, to increase visibility of the elevated reference element, or to increase the degree of shape differentiation in the images of the reference elements.

The output of this stage of the position determination module 124 is reference information that reflects the presence of a captured image of the reference array 140. The position determination module 124 next converts the determined reference information into position information.

The task of converting reference information into position information varies depending on numerous environment-specific factors. For example, because the image of the reference element array has a pattern formed by a nonparallel projection of the reference triangle onto the image sensor, the pattern carries information of the relative position between the image sensor and the reference element array, and changes as the relative position changes. Geometric method may be used to approximate the position and orientation of the user-manipulated device 110. The position information extracted from the pattern may express a multidimensional position of the image sensor with respect to multiple axes. As described in further detail herein, the position and orientation may be described using a six-axis system which expresses a multi-axis position of the user-manipulated device with respect to three axes (x-axis, y-axis and z-axis) describing a translational position, and three rotational axes describing a pitch motion, a roll motion, and a yaw motion.

In one case, this transformation can be expressed by one or more geometrical mapping equations. The mapping equations can take into consideration any one or more of: the position of the reference elements with respect to one or more fixed reference points; the position of the reference elements with respect to each other (not only the distances but also the geometric shape); the movement of the images of the reference elements (when compared between frames shot at different times), and so on. The equations can include various correction factors to account for the distortion produced by the video camera 112, as well as other potential considerations. A calibration procedure can be use to calibrate the positioning determination module 124, and to thereby facilitate determination of various such correction factors.

Generally, with one triangular set of the reference elements 141, 142 and 143, the position determination module 124 can track the as many as positions and orientations with respect to six axes, including both the three-dimensional location and three-dimensional orientation of the user-manipulated device 110. The use of additional reference elements further enhances the amount of positioning detail or accuracy that can be extracted from the reference information, and in some cases may also avoid "blind spots".

The position information learned from the image information can be supplemented by other input, e.g., as obtained from the other input device(s) 150. One such other input device that can be used is any kind of inertial sensor or combination of inertial sensors, such as accelerometers and gyroscopes. As well known, inertial sensors provide positioning information that is relative in nature. For example, an inertial sensor can provide position information that indicates that the user has moved the user-manipulated device 110 up five inches at a particular rate. The position determination module 124 can use this kind of supplemental position information to help validate the accuracy of position information obtained via the image information. In other instances, there are times when the video camera 112 cannot "see" the reference elements 141, 142 and 143. In this case, the positioning information obtained from the inertial sensor(s) (or other supplemental input device) can be used to overcome the "blind spots" in the camera 106's image information.

The position determination module 124 feeds its generated position information to an application module 126. The application module 126 represents any kind of application that can perform any prescribed set of functions. For instance, the application module 126 can represent a simulation application (such as a flight simulator application), a game application of any variety, an Internet navigation application, and so on. In any event, the application module 126 uses the position information to control its behavior. The specific nature of this control depends on the nature of the application module 126 itself. For instance, some applications are conventionally controlled by a computer mouse or a keyboard. For these applications, the determined the position information may be used to generate mouse or keyboard input for various operations in the application.

The application module 126 can provide any kind of output which reflects the outcome of its control behavior. For example, the application module 126 can generate a visual output via a display interface module 128. The display interface module 128 presents the visual output on display screen 133 of display device 130. The display device 130 may be a television set of any kind, a computer monitor of any kind, and so on.

In FIG. 1, the system 100 is shown to have position determination module 124 located within electronic device 120. However, it is appreciated that this module may either be a separate unit connected to electronic device 120, or a unit implemented within user-manipulated device 110. With the miniaturization of modern processes, is feasible to have a position determination module 124 built into even a compact user manipulation device 110. Furthermore, transmitting positional information may take less bandwidth than transmitting image information, which may be a consideration if the user-manipulated device 110 communicates with the electronic device 120 wirelessly. However, where multiple user-manipulated devices 110 are used for controlling a single electronic device 120, it may be less costly to build a centralized position determination module 124 in the electronic device 120 instead of in each user-manipulated device 110.

Consider various specific exemplary scenarios to facilitate understanding of the nature of the control affected by the system 100. In one application, the application module 126 displays some kind of marker on the display screen 133, such as a pointer or a cursor. For example, the marker can be equivalent of mouse cursor useful activity a certain button displayed on the display screen 133. The user can move the marker to a different location on the display screen 133 by pointing to the different location on the display screen 133 with the user-manipulated device 110. To perform this task, it is first assumed the video camera 112 can "see" the reference elements 141, 142 and 143 during the above-described movement. The position determination module 124 extracts reference information from the image information produced by the video camera 112, and then converts the reference information to position information. The application module 126 uses the position information to adjust the position of the marker on the display screen 133. This can be performed by mapping the position information to an on-screen position using one or more mapping equations. The on-screen position reflects an object that the user is pointed to using the user-manipulated device 110.

In another application, the marker may be an indicator of an aim targeting an object displayed on the display screen 133. For example, the application module 126 may present an object to aim at in a shooter-type game. The user can aim at the object by pointing the user-manipulated device 110 at the object. (In this context, the user-manipulated device 110 can optionally be shaped like a weapon.) The position determination module 124 and the application module 126 work in the way described above to translate the physical movements of the user-manipulated device 110 to corresponding movement of the on-screen field of focus of the user's weapon. In either the first or second applications, the user can perform supplemental actions with the user-manipulated device 110, such as by selecting a particular object that is being pointed to, shooting a particular object, and so on. In another case, the user may use the above-described techniques to aim at and control some other object that is not necessarily displayed by a displayed device, such as stereo equipment, an appliance, etc.

The above two examples feature the case in which the user points to an object using the user-manipulated device 110. However, in other applications, the user can use the user-manipulated device 110 to achieve other kinds of control. For example, the user can make a characteristic gesture using the user-manipulated device 110 (such as by waving the user-manipulated device 110 in a predetermined manner). The position determination module 124 in conjunction with the application module 126 can recognize the gesture by comparing video captured by the video camera 112 with predetermined patterns. The application module 126 can execute a control operation based on the type of gesture made by the user, as identified by the position information.

In another exemplary case, a game application may "watch" the movements of the user by tracking the position of the reference elements 141, 142 and 143 in the manner described above, and then providing appropriate control based on the user's movement. For instance, a shooting game may attempt to virtually fire at the user based on the user's movements. Here, the user is not attempting to fire upon an on-screen object, but is attempting to avoid being fired upon.

In another exemplary case, an application can monitor the movements of the user in the manner described above. The application can provide an on-screen character or other object that mimics the movements of the user.

Still other applications of the system 100 are possible.

Figure 2:
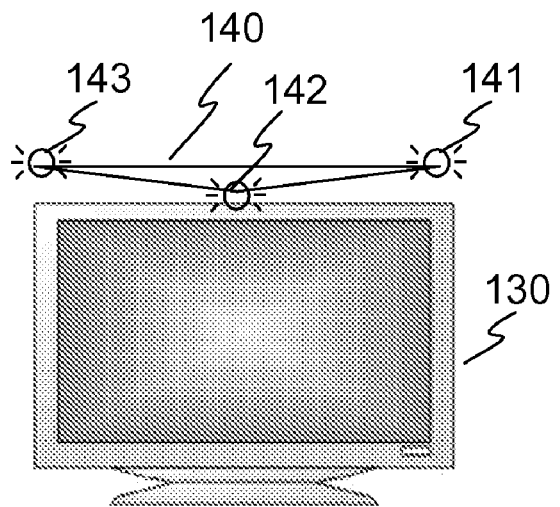
FIG. 2 illustrates multidirectional movement of a user-manipulated device relative to a display device and a reference element array.
Figure 2:
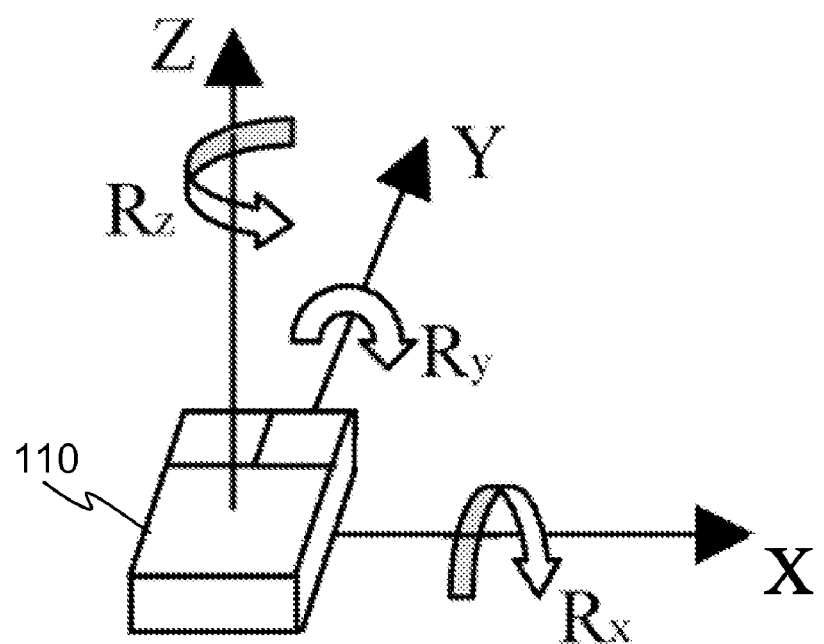

FIG. 2 illustrates the multidirectional movement of the user-manipulated device 102 relative to the display device 130 and the reference element array 140 including reference elements 141, 142 and 143. The user-manipulated device 102 is placed opposite to the display device 130 and the reference element array 140. As shown in FIG. 2, the first aspect of the position of the user-manipulated device 102 is described by the three axes (x-axis, y-axis and z-axis). The change of this position relates to a three-dimensional displacement or translational motion (left-and-right along the x-axis, back-and-forth along the y-axis, and up-and-down along the z-axis). The second aspect of the position of the user-manipulated device 102 relates to orientation and is described by three rotational axes, namely Rx rotational axis describing a pitch motion, Ry rotational axis describing a roll motion, and Rz rotational axis describing a yaw motion. The video camera 114 (not shown in FIG. 2, but in FIG. 1) captures an image of the reference element array 140. As will be shown with reference to the following features, the image has a pattern that changes with these motions.

Figure 3:
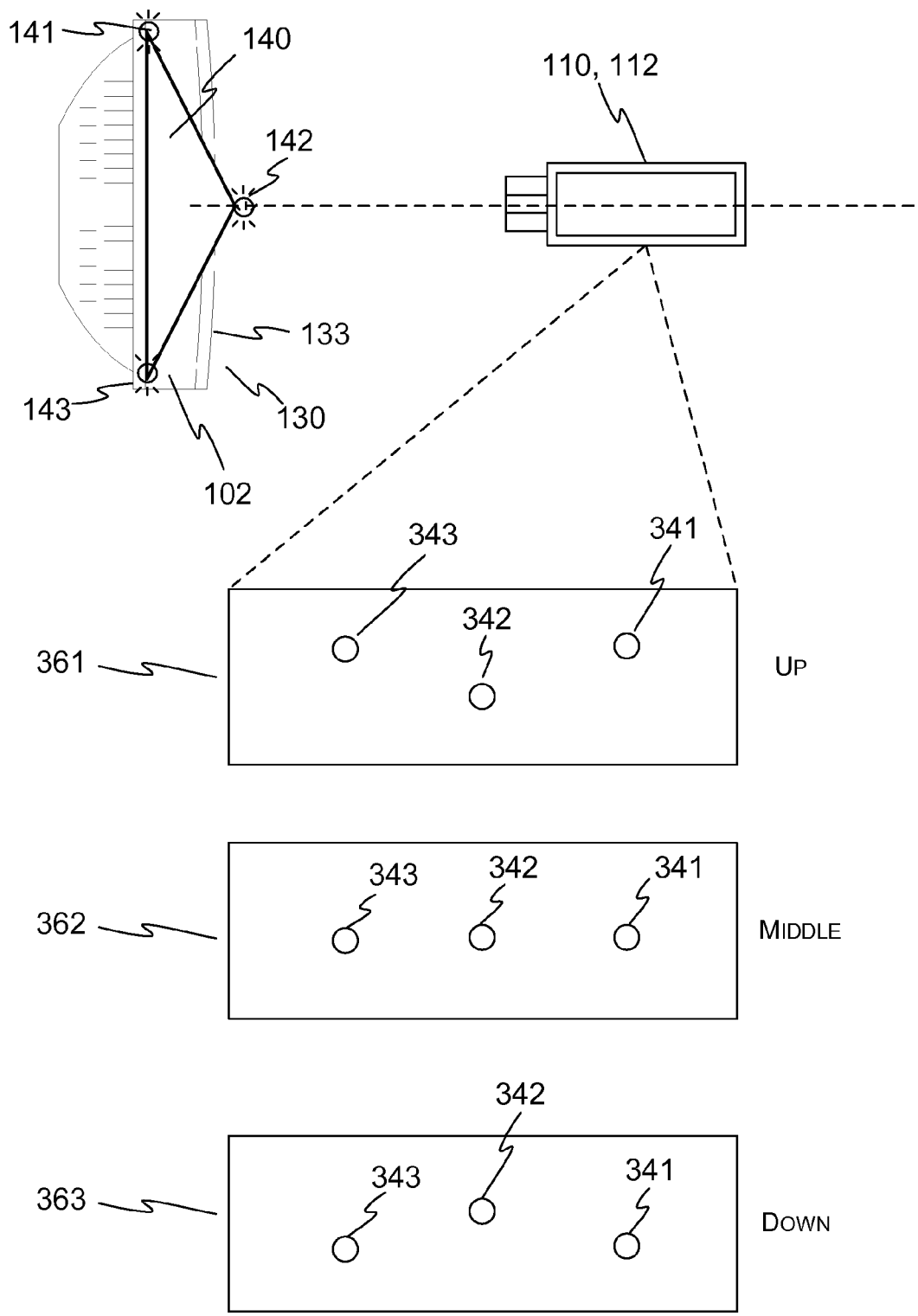
FIG. 3 shows a top view illustrating the change of the image pattern of the reference element array as the video camera moves up and down along the z-axis.

FIG. 3 shows a top view 300 illustrating the change of the image pattern of the reference element array 140 as the video camera 112 moves up and down along the z-axis. As the video camera 112 (which is affixed to the user-manipulated device 110 as shown in FIG. 1) moves up, camera view 361 shows three light spots 341, 342 and 343, corresponding to the reference elements 141, 142 and 143, respectively. Each light spot 341, 342 and 343 is an image of the respective reference element 141, 142 and 143. These three images (light spots 341, 342 and 343) form a triangular pattern. As the video camera 112 is at a level position with the reference element array 140, camera view 362 shows the light spots 341, 342 and 343 aligned into a straight line. As the video camera 112 moves than, camera view 363 shows the light spots 341, 342 and 343 again forming a pattern of a triangle, but inverse as compared to that in camera view 361 when the video camera 112 is in an upper position.

Figure 4:
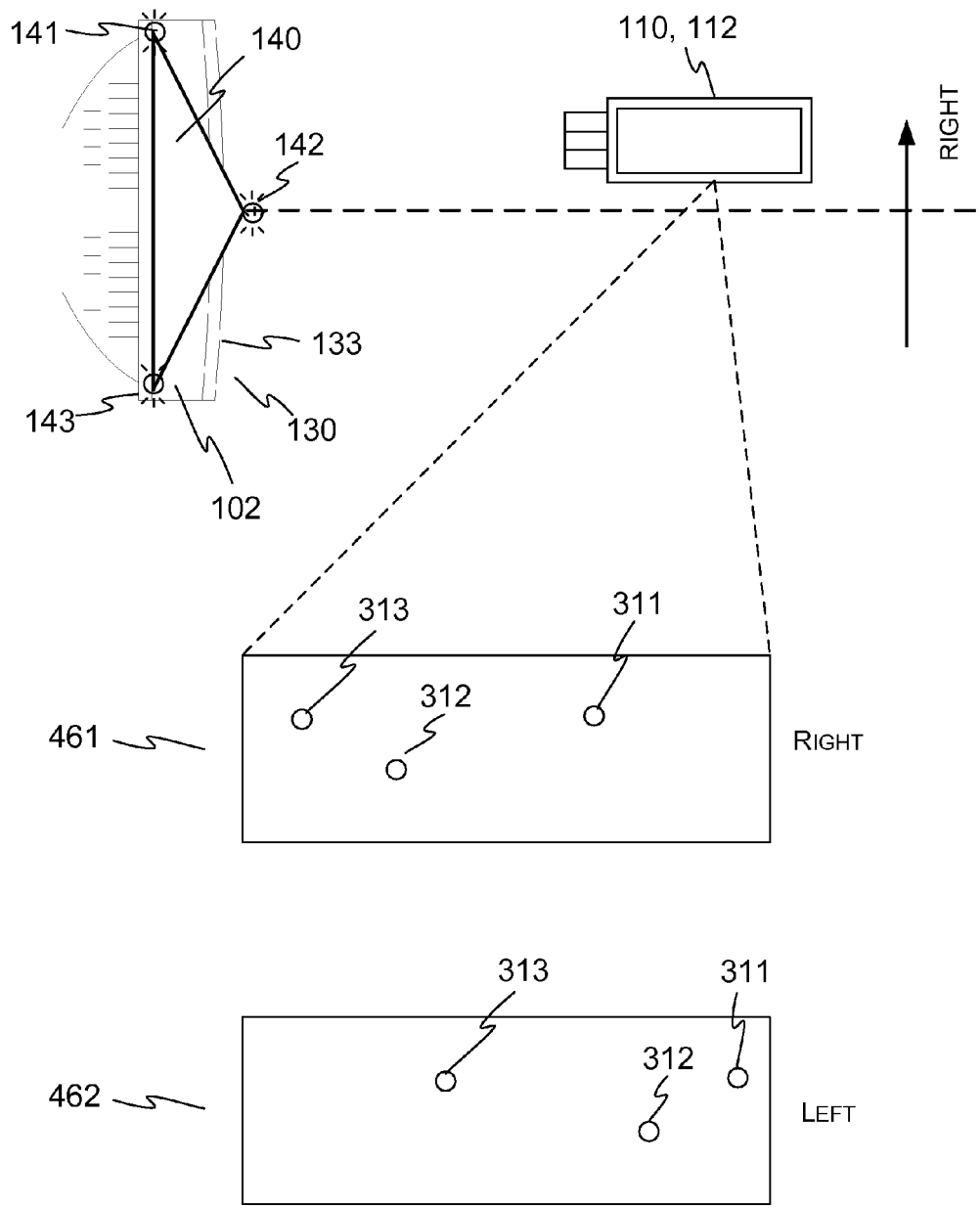
FIG. 4 shows a top view illustrating the change of the image pattern of the reference element array as the video camera moves left and right along the x-axis.

FIG. 4 shows a top view 400 illustrating the change of the image pattern of the reference element array 140 as the video camera 112 moves left and right along the x-axis. Camera view 461 is when the camera 112 (along with the user-manipulated device 110) moves to the right side, showing a non-equilateral triangle pattern of the light spots 311, 312 and 313. The triangle as a whole shifts to the left side of camera view 461. Camera view 462 is when the camera 112 moves to the left side, showing a non-equilateral triangle pattern of the light spots 311, 312 and 313. The triangle in camera view 462 is a mirror image of that in camera view 461, and as a whole shifts to the right side of camera view 461.

When the video camera 112 moves back and forth along y-axis in relation to the display device 130, the change of the image pattern (not shown) depends on the relative position of the video camera 112 in the other two dimensions (x-axis and z-axis). For example, if the video camera 112 is aligned with the center of the reference element array 140 with respect to x-axis and z-axis, moving the video camera 112 along the y-axis only changes the size of the triangle pattern of light spots 311, 312 and 313 and does not affect the shape thereof.

Figure 5:
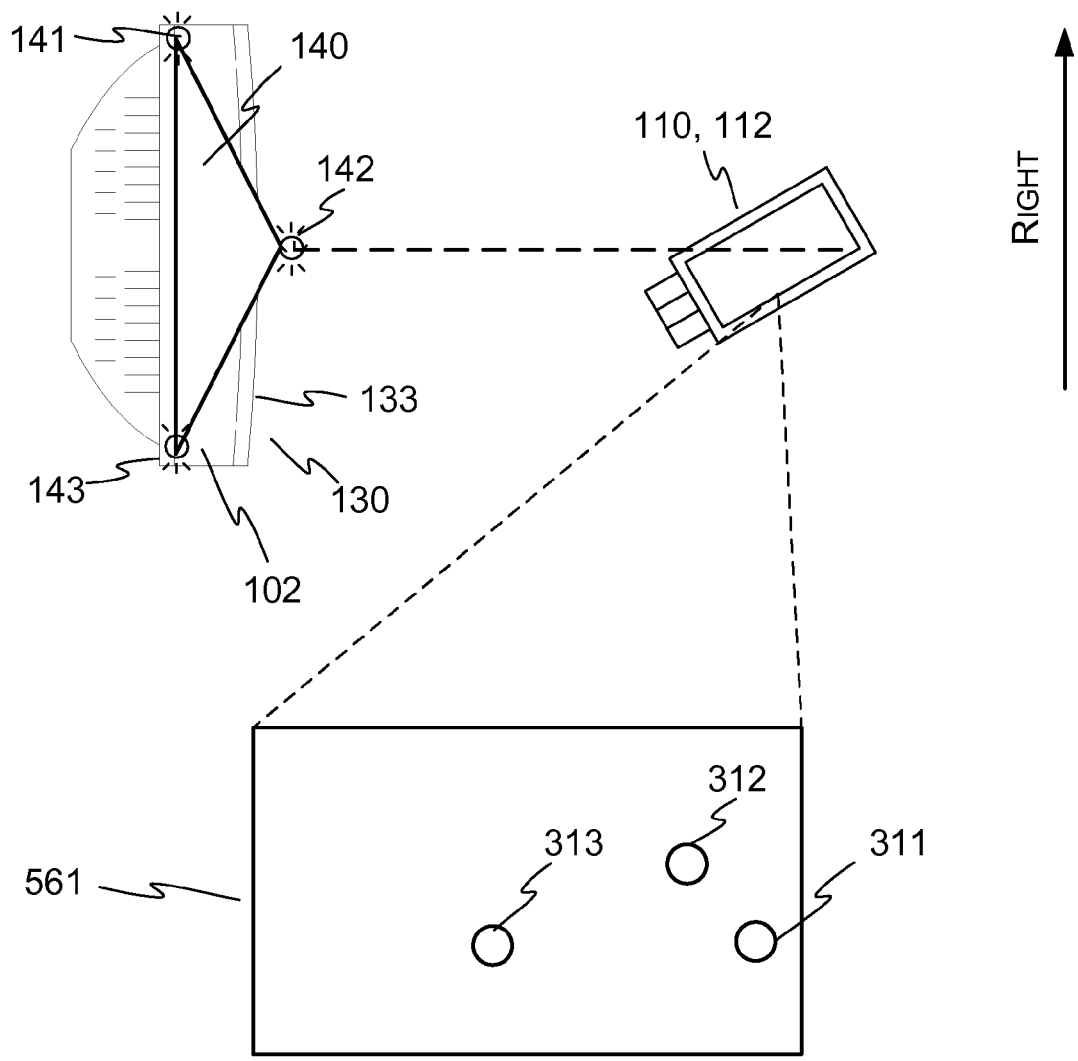
FIG. 5 shows a top view illustrating the change of the image pattern of the reference element array as the video camera experiences a yaw motion around the z-axis.

FIG. 5 shows a top view 500 illustrating the change of the image pattern of the reference element array 140 as the video camera 112 experiences a yaw motion around the z-axis. Camera view 561 is when the camera 112 yaws to the left side, showing a non-equilateral triangle pattern of the light spots 311, 312 and 313. The triangle as a whole shifts to the right side of camera view 561. When the camera 112 yaws to the opposite direction, the change of the image pattern will show a mirror image of that in camera view 561, and the image pattern as a whole shifts to the left side of camera view 561.

Figure 6:
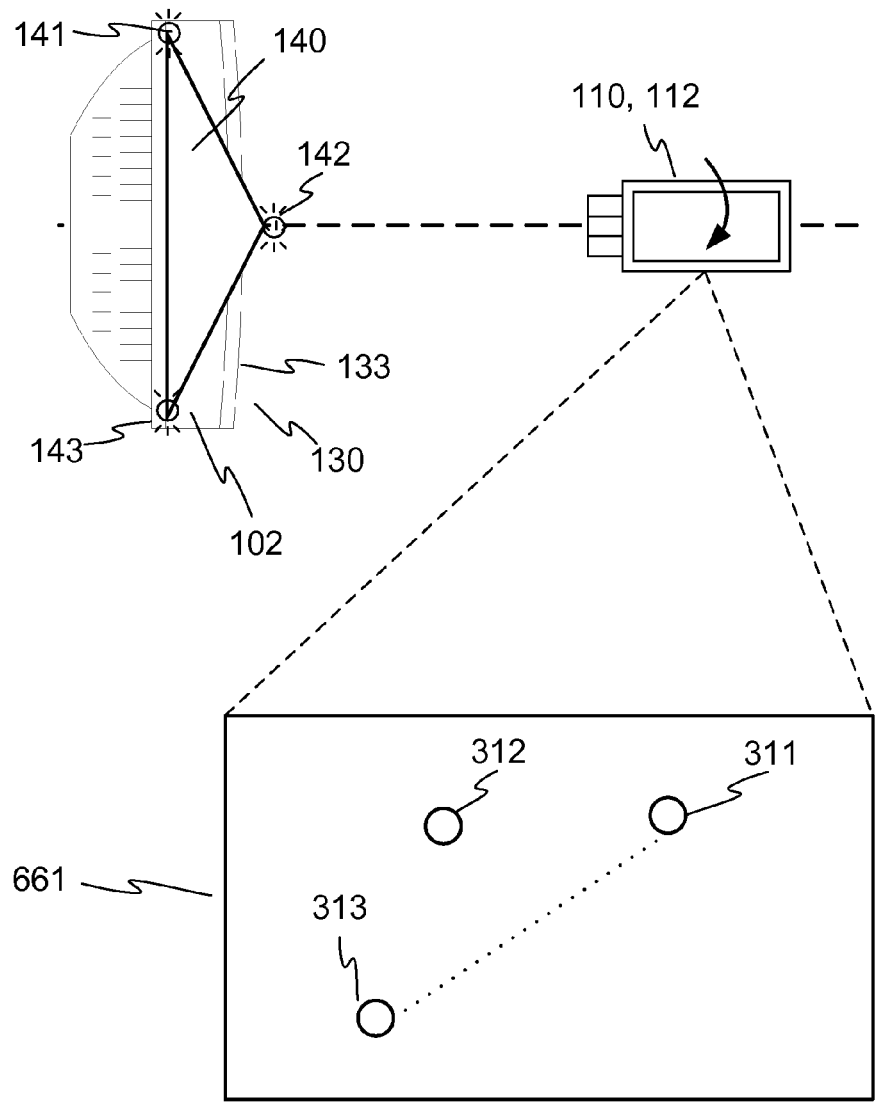
FIG. 6 shows a top view illustrating the change of the image pattern of the reference element array as the video camera experiences a roll motion around the y-axis.

FIG. 6 shows a top view 600 illustrating the change of the image pattern of the reference element array 140 as the video camera 112 experiences a roll motion around the y-axis. Camera view 661 is when the camera 112 rolls to the left side, showing a skewed triangle pattern of the light spots 311, 312 and 313. When the camera 112 rolls to the opposite direction, the image pattern will show similar triangle skewed to the opposite direction.

Figure 7:
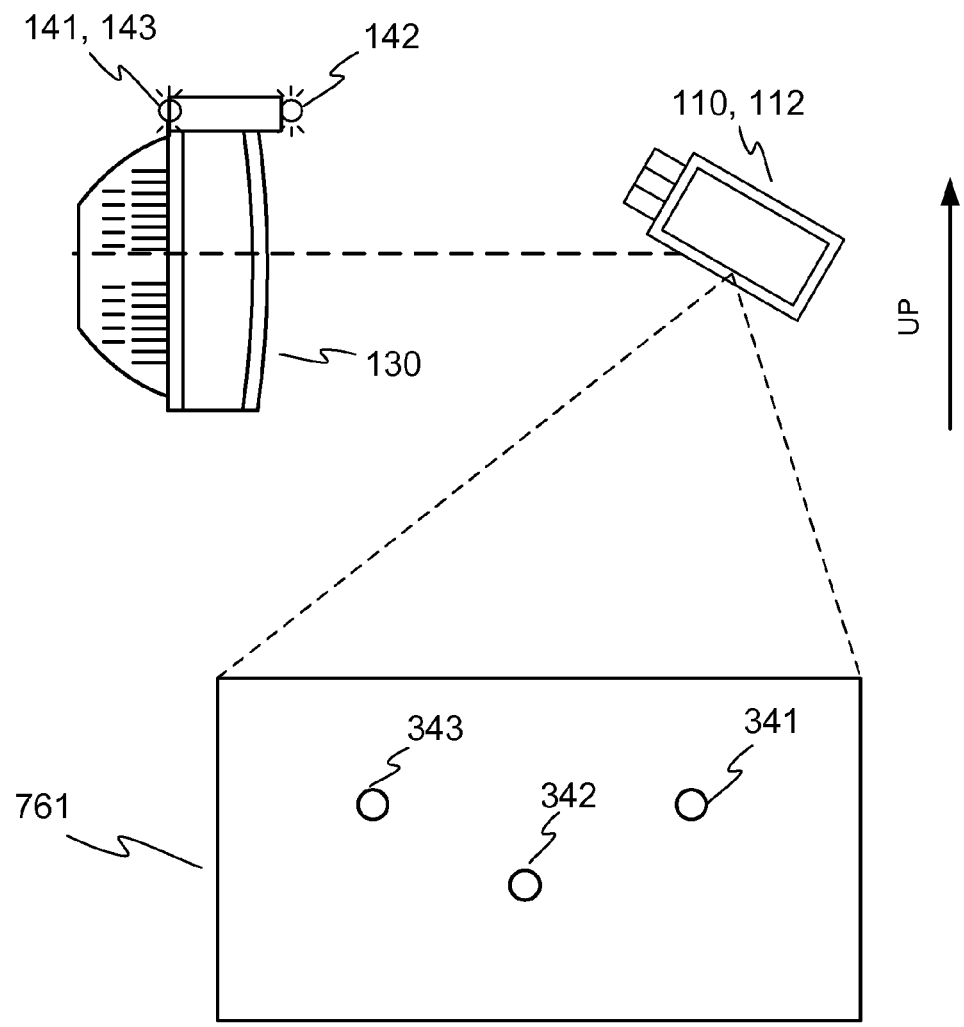
FIG. 7 shows a left side view illustrating the change of the image pattern of the reference element array as the video camera experiences a pitch motion around the x-axis.

FIG. 7 shows a left side view 700 illustrating the change of the image pattern of the reference element array 140 as the video camera 112 experiences a pitch motion around the x-axis. Camera view 661 is when the video camera 112 pitchers to the upper side, showing a triangle pattern of the light spots 311, 312 and 313. In general, the height of the triangle measured from the light spot 342 (corresponding to the forward reference element 142) to the baseline defined by the light spots 341 and 343 increases as the video camera 112 pitches higher. When the camera 112 pitchers downward, the change of the image pattern will show an inverse image of that in camera view 761, with the light spot 332 shifts upward above the light spots 341 and 343 in the camera view.

The exemplary changes of the image pattern of the reference element array 140 in the video camera 112 illustrated above show how the image pattern change relates to the various motions of the video camera 112 (along with the user-manipulated device 110) with respect to the six axes. The image of the reference element array 140 is a result of projecting the triangle formed by the three reference elements 141, 142 and 143 through a three-dimensional space onto image sensor 114. The projection also goes through an optical path of the optics (lens) of the video camera 112. A geometric relationship between the change of the pattern shape and the change of position and orientation of the user-manipulated device 110 can be established in order for the position determination module 124 to determine position information from the image information.

The above motion-based pattern changes are described for the purpose of illustration only, and should not be construed as a limitation to the claims attached to this description.

A.2. Second Type Implementation: Stationary Video Camera (FIG. 8)

Figure 8:
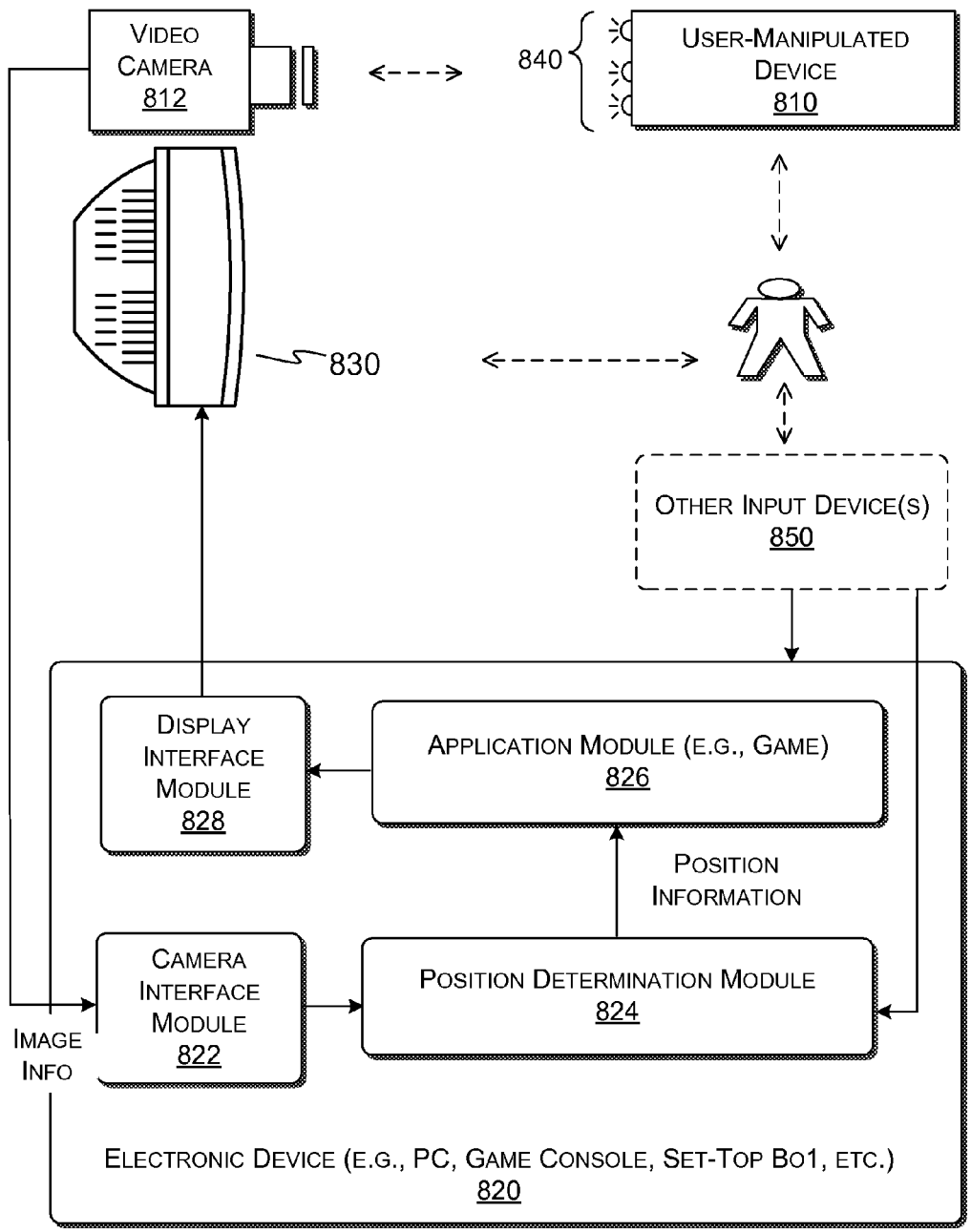
FIG. 8 is a block diagram showing a second implementation of the strategy for controlling an electronic device based on image information obtained from a video camera.

FIG. 8 shows a second implementation of the strategy for controlling an electronic device 820 or an application run by the electronic device 820 based on image information obtained from a video camera 812. FIG. 8 describes a system 800 in which user-manipulated device 810 and video camera 812 are separated and placed opposing each other. In the embodiment shown, video camera 812 is placed on top of display device 830. A reference element array 840 including three reference elements are coupled to user-manipulated device 810. Similar to that illustrated in FIG. 1, the three reference elements of reference element array 840 may be arranged to form a triangle placed either in front of the user-manipulated device 810 (as shown) or on a side thereof.

Similar to the first type implementation in FIG. 1, the system 800 has camera interface module 822 interfacing between video camera 812 and position determination module 824, and display interface module 828 interfacing between display device 830 and application module 826.

Despite the opposite arrangement as compared to the implementation in FIG. 1, the system in the second type implementation works in a similar manner. One difference is that usually there is limited space on user-manipulated device 810 and as a result the size of the triangle formed by the reference element array 840 may be much smaller than its counterpart afforded by reference element array 140 in the first type implementation shown in FIG. 1. For this reason, higher precision may be needed for position determination in the second type implementation.

The system 800 can be applied to various scenarios as described in relation to system 100 of FIG. 1.

A.3. Processing Functionally (FIG. 9)

Various components of the electronic devices (120, 820) (of FIGS. 1 and 8) can be implemented by processing equipment. FIG. 9 shows a general depiction of processing functionality 900 that can be used to implement any of components of the electronic devices (120, 820).

The processing functionality 900 can include various volatile and non-volatile memory, such as RAM 904 and ROM 906, as well as one or processing devices 908. The memory (904, 906) can store instructions which perform the various functions described above when executed by the processing devices 908. For example, a subset of such instructions can implement the position determination module (124, 824) of FIGS. 1 and 8. The processing functionality 900 also optionally includes various media devices 910, such as a hard disk module, an optical disk module, and so forth. The processing functionality 900 also includes an input/output module 912 for receiving various inputs from the user, and for providing various outputs to the user. The processing functionality 900 can also include one or more network interfaces 914 for exchanging data with other devices. One or more communication buses 916 communicatively couple the above-described components together.

Figure 9:
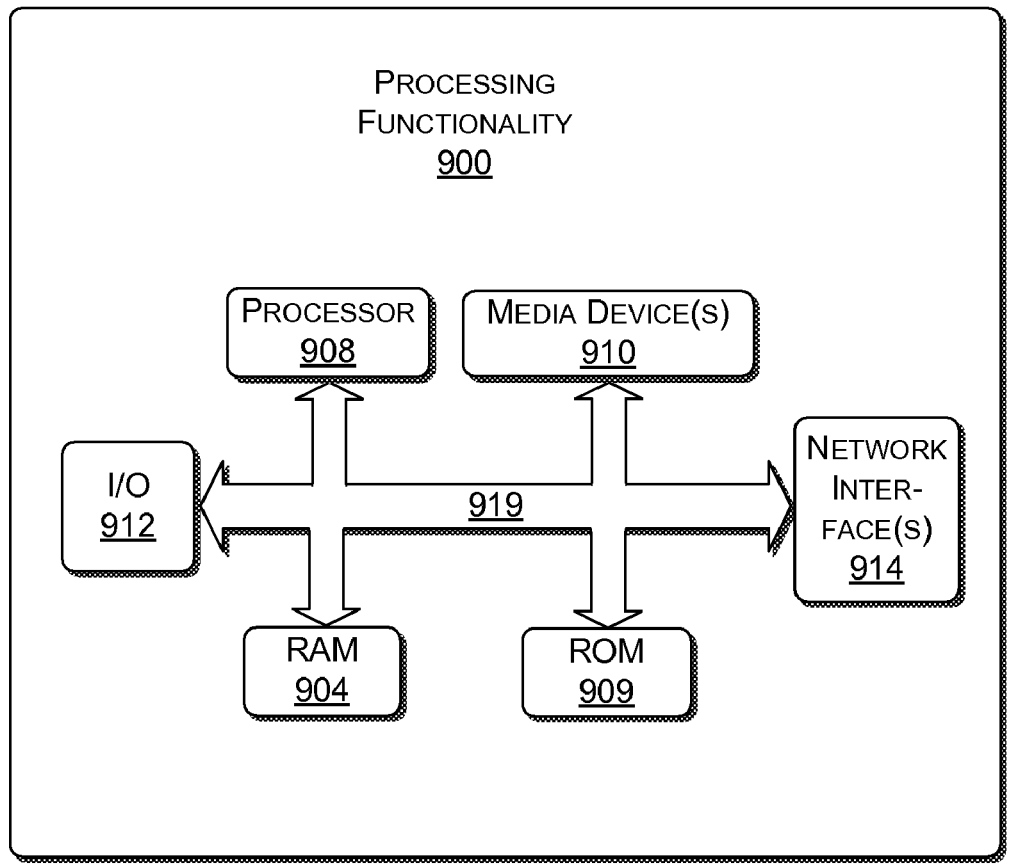
FIG. 9 shows a general depiction of a processing functionality that can be used to implement any of components of the electronic devices.

In various applications, the processing functionality 900 shown in FIG. 9 can include additional modules or can omit one or more of the modules shown in FIG. 9.

B. Exemplary Processes (FIG. 10)

Figure 10:
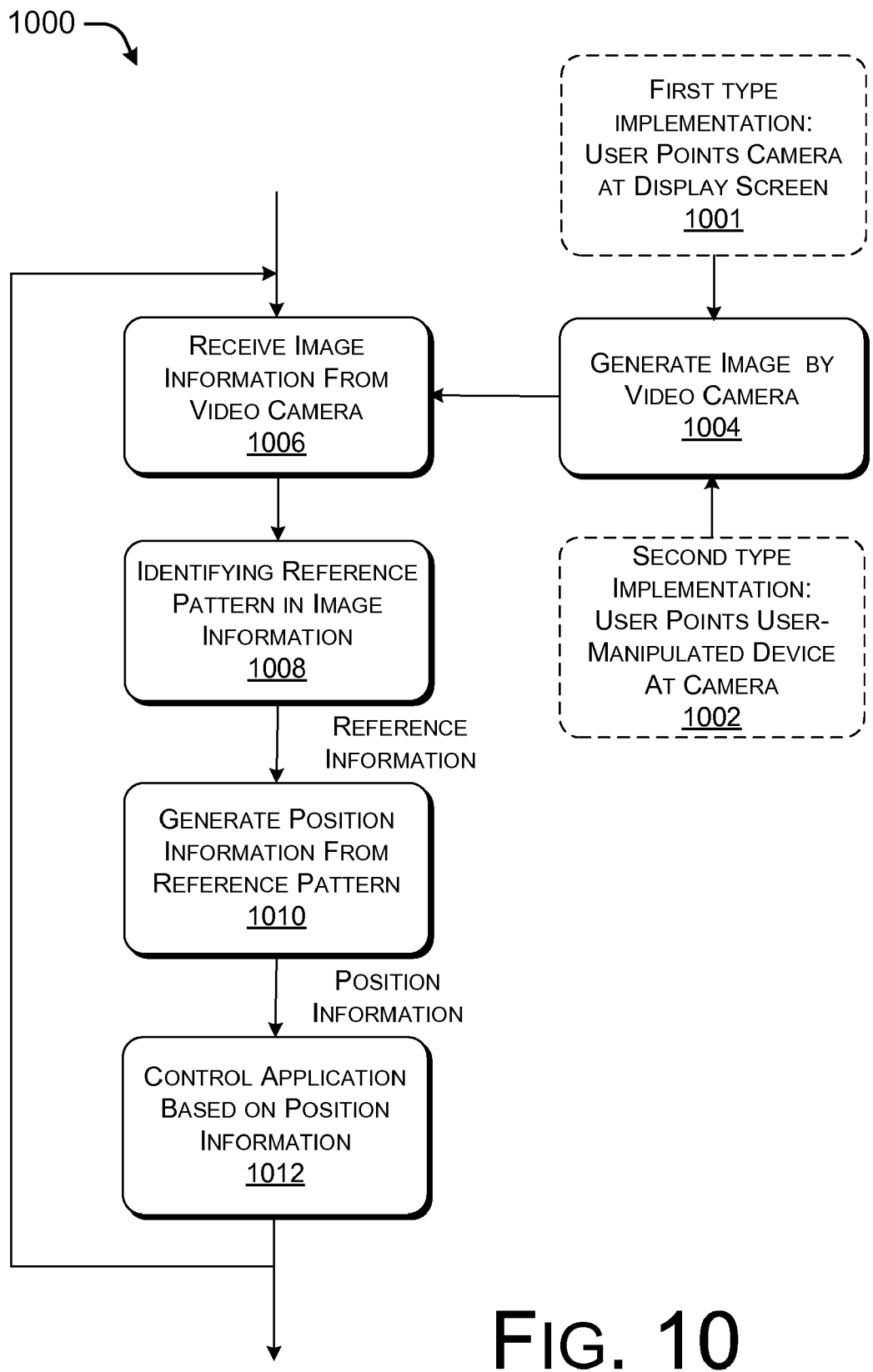
FIG. 10 shows an overview of one exemplary procedure that can be implemented by the systems of FIGS. 1 and 8, or by some other system.

FIG. 10 shows an overview of one exemplary procedure 1000 that can be implemented by the systems (100, 800) of FIGS. 1 and 8, or by some other system. To facilitate discussion, certain operations are described as constituting distinct steps performed in a certain order. Such implementations are exemplary and non-limiting. Certain operation can be grouped together and performed in a single operation, and certain operations can be performed in an order that differs from the order employed in the examples set forth in this disclosure. Since the nature of the operations performed in the procedure 1000 have already been described in Section A, this section serves primarily as a summary of those operations.

Depending on whether the first type implementation or second type implementation is used, the procedure 1000 stars at block 1001 or 1002. In block 1001, which indicates first type implementation shown in FIG. 1, the user points user-manipulated device 110 together with video camera 112 (including image sensor 114) at display screen 130. In block 1002, which indicates second type implementation shown in FIG. 8, the user points user-manipulated device 810 together with reference element array 840 at the video camera 812.

In block 1004, the video camera (112, 812) generates an image of the reference element array (140, 840) on image sensor (114, 814). The reference element images have a pattern formed by projecting the reference element array (e.g., a triangle shaped array) through a three-dimensional space onto the image sensor.

In block 1006, the electronic device (120, 820) receives image information from the video camera (112, 812). According to block 1001, in the first implementation, the image information is obtained in response to the user pointing user-manipulated device 110 at some on-screen object or some other object that is not necessarily displayed on the screen (or performing some other action using the user-manipulated device 110). The user-manipulated device 810 includes the video camera 112 coupled thereto. The reference element array 140 is placed nearby or on top of the display device 130 and is viewable by be video camera 112. According to block 1002, in the second implementation, the image information is obtained in response to the user pointing the user-manipulated device 810 at the display screen 830 or some other object that is not necessarily displayed on the screen (or performing some other action using the user-manipulated device 810). The user-manipulated device 810 includes reference element array 840 coupled thereto which are viewable by the video camera 812 placed nearby or on top of the display device 830.

In block 1008, the position determination module (124, 824) identifies a reference pattern in image information.

In block 1010, the position determination module (124, 824) generates position information based on the identified reference pattern.

In block 1012, the application module (126, 826) affects some kind of control based on the position information provided by the position determination module (124, 824). Such control may, in one instance, involve determining what object the user is pointing at using the user-manipulated device (110, 810).

CONCLUSION

A triangle reference element array, such as a triangle LED bar, is used to provide three or more groups of light markers. By using these markers, the host electronic device can track both the three-dimensional location and three-dimensional orientation of the user-manipulated device, such as a hand-held remote control. The user is therefore able to express more actions using multinational motion freedom.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system for motion-based controlling of an electronic device, the system comprising:
   a user-manipulated device;
   an image sensor;
   a reference element array including a first reference element, a second reference element and a third reference element each having a different size from one another and defining vertices of a reference triangle, the reference triangle defining a plane substantially nonparallel to a front surface of a display, one of the image sensor or the reference element array being attached to the user-manipulated device, the reference element array forming an array image on the image sensor through a nonparallel projection of the reference triangle onto the image sensor, the array image having a pattern changing shape as a relative position between the image sensor and the reference element array changes, at least one of the first reference element, the second reference element, or the third reference element elevated off a plane with respect to non-elevated reference elements to facilitate discrimination of the at least one elevated reference element from the non-elevated reference elements, to increase visibility of the elevated reference element, and to increase a degree of shape differentiation of the array image; and
   a position determination module configured to:
      receive image information from the image sensor, the image information including a reference element image of each reference element, each reference element image comprising multiple pixels;
      identify a pattern of reference elements from the image information by clustering the multiple pixels of each reference element image to a separate group and calculating a weighted barycenter of each group based on brightness as a weight; and
      generate position information based on the pattern of the reference elements identified in the image information, the position information expressing the relative position between the image sensor and the reference element array.

2. The system as recited in claim 1, wherein the image sensor is a part of a video camera attached to the user-manipulated device, the relative position between the image sensor and the reference element array representing a position of the user-manipulated device relative to the reference element array.

3. The system as recited in claim 2, wherein the video camera is an integral part of the user-manipulated device.

4. The system as recited in claim 1, wherein the electronic device comprises a game console.

5. The system as recited in claim 1, wherein the reference element array is adapted for being placed near the display when the display is connected to the electronic device such that at least one of the reference elements is located in a position outward from the front surface of the display.

6. The system as recited in claim 1, wherein the plane defined by the reference triangle is substantially perpendicular to the front surface of the display.

7. The system as recited in claim 1, wherein the reference element array is adapted for being placed on a top or near a bottom portion of the display.

8. The system as recited in claim 1, wherein the position determination module is configured to generate position information using geometric relations based on the nonparallel projection of the reference triangle through a three-dimensional space onto the image sensor to form the array image.

9. The system as recited in claim 1, wherein the position determination module is configured to generate position information capable of expressing a multi-axis position of the user-manipulated device with respect to three axes (x-axis, y-axis and z-axis) describing a translational position, a first rotational axis describing a pitch motion, a second rotational axis describing a roll motion, and a third rotational axis describing a yaw motion.

10. The system as recited in claim 1, wherein the position determination module receives from the image sensor a series of sequential frames during a time period, each frame containing a shot of the array image, and wherein the position determination module is configured to track the position of the user-manipulated device in real-time.

11. The system as recited in claim 1, wherein the position determination module is located in the electronic device.

12. The system as recited in claim 1, wherein the position determination module is located in the user-manipulated device.

13. The system as recited in claim 1, wherein the user-manipulated device further comprises a supplemental motion detection sensor.

14. The system as recited in claim 1, wherein the position determination module receives information of the array image from the image sensor wirelessly.

15. A system for motion-based controlling of an electronic device, the system comprising:
  a user-manipulated device including a video camera associated therewith;
  a reference element array including a first reference element, a second reference element and a third reference element, each having a different size from one another and defining vertices of a reference triangle, the reference element array located near a display connected to the electronic device such that the reference triangle defines a plane substantially nonparallel to a front surface of the display for positioning at least one of the reference elements in a location forward of the front surface of the display, the reference element array forming a reference element image through a nonparallel projection of the reference triangle onto the video camera when the video camera is at least partially facing the reference element array, the reference element image forming a pattern which varies in shape as the user-manipulated device changes position in relation to the reference element array, at least one of the first reference element, the second reference element, or the third reference element elevated off a plane with respect to non-elevated reference elements to facilitate discrimination of the at least one elevated reference element from the non-elevated reference elements, to increase visibility of the elevated reference element, and to increase a degree of shape differentiation of the reference element image; and
  a position determination module configured to:
    receive information of the reference element images from the video camera;
    identify a pattern of the reference elements from the information of the reference element images based, at least in part, on the different sizes of the first reference element, the second reference element and the third reference element distinguishing the reference elements from one another; and
    generate position information based on the identified pattern of the reference elements, the position information expressing a position of the video camera relative to the reference element array.

16. The system as recited in claim 15, wherein the reference element array is configured to be placed on top of the display connected to the electronic device.

17. A method for motion-based control of an electronic device having a display with a front display surface, the method comprising:
  generating on an image sensor a first reference element image of a first reference element, a second reference element image of a second reference element, and a third reference element image of a third reference element, the reference elements forming a reference triangle that defines a plane substantially nonparallel to a front surface of the display, the reference element images having a pattern formed by a nonparallel projection of the reference triangle through a three-dimensional space onto the image sensor, the first reference element, the second reference element and the third reference element each having a distinctive size, the first reference element elevated off a plane with respect to the second reference element and the third reference element to facilitate discrimination of the first reference element from the second reference element and the third reference element, to increase visibility of the first reference element, and to increase a degree of shape differentiation among the first reference element image, the second reference element image, and the third reference element image;
  receiving information of reference element images from the image sensor;
  differentiating the first reference element image, the second reference element image and the third reference element image based, at least in part, on the distinctive sizes of the first reference element, the second reference element and the third reference element;

identifying the pattern formed by the first reference element image, the second reference element image and the third reference element image;

generating multi-axis position information based on the identified pattern of the reference element images, the multi-axis position information expressing a relative position between the image sensor and the reference element array; and controlling the electronic device using the multi-axis position information.

18. The system as recited in claim 1, wherein the first reference element, the second reference element and the third reference element each have a monotonic primary color characteristic.

19. The system as recited in claim 18, wherein each reference element is a light emission device that emits a different monotonic primary color.

* * * * *